Dec. 3, 1963 J. R. BARR 3,113,172
PRESSURE RELIEF DEVICE
Filed Dec. 24, 1958 2 Sheets-Sheet 2
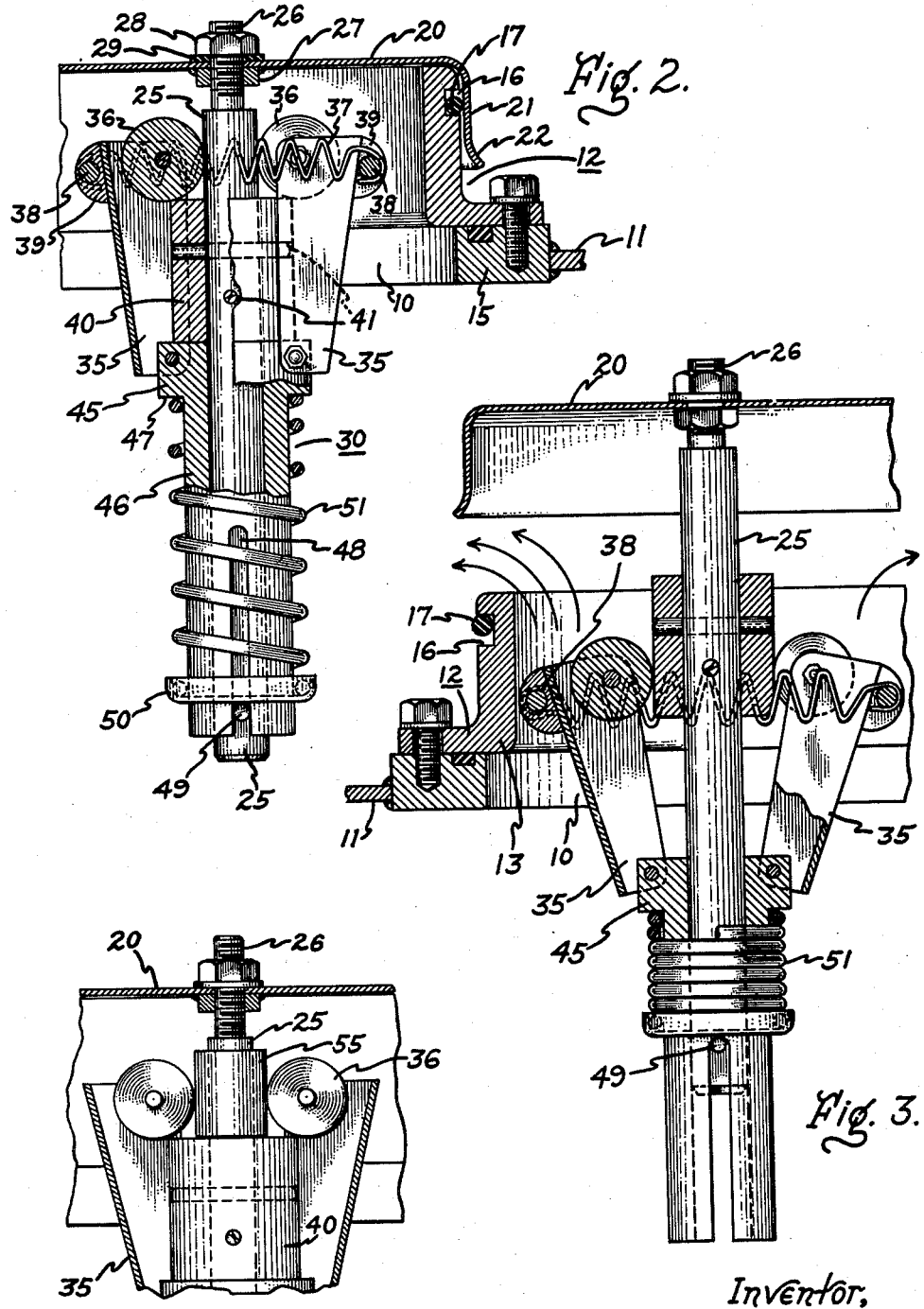
Inventor,
James R. Barr,
by Gilbert P. Tarlton
His Attorney.

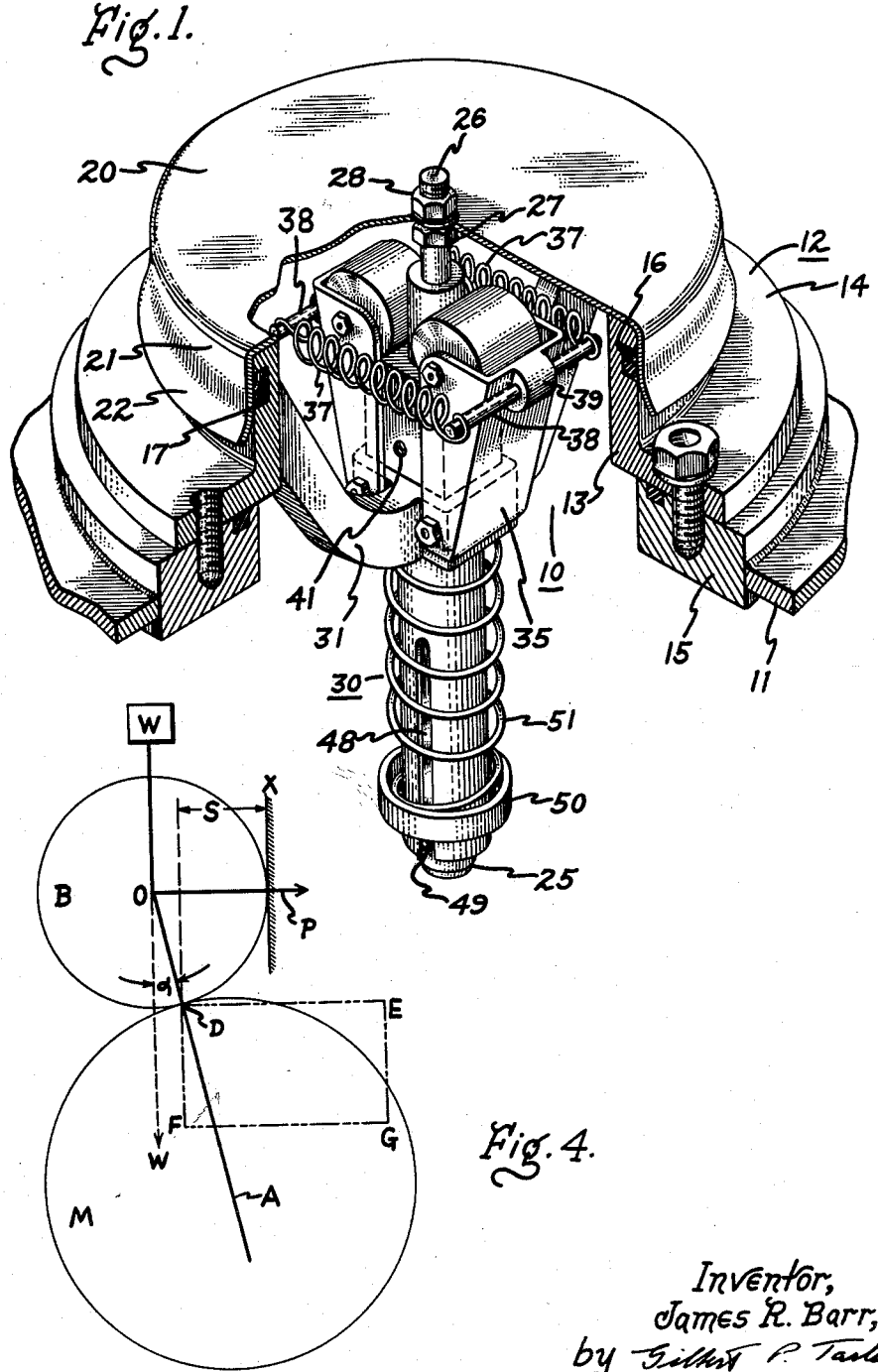

United States Patent Office 3,113,172
Patented Dec. 3, 1963

3,113,172
PRESSURE RELIEF DEVICE
James R. Barr, Rome, Ga., assignor to General Electric Company, a corporation of New York
Filed Dec. 24, 1958, Ser. No. 782,839
4 Claims. (Cl. 174—11)

This invention relates to pressure relief devices, and more in particular to an improved pressure relief device especially adapted to automatically release excess pressure from enclosed electrical apparatus such as transformers and the like. It will be understood, however, that the invention may also be employed for relieving pressure on other types of enclosures without departing from the spirit or scope thereof.

Totally enclosed electrical apparatus, such as power transformers or the like, are occasionally subjected to high internal pressure resulting from certain fault conditions. In order to prevent structural damage to the equipment, it is desirable to provide means for releasing the internal pressure. In order to provide effective protection for the apparatus, it is necessary that the pressure relief device operate consistently at the same magnitude of internal pressure, and that the accurate operation thereof is not affected by variables such as gripping of aged gaskets on the cover of the device. To further insure accurate operation, it is also desirable that a minimum number of components be employed in the device, and also that the operation of the device be dependent to a minimum upon friction between moving parts. In addition, it is also desirable that the resetting of the relief device after operation involve as simple a procedure as possible.

In the past, many arrangements have been employed for the relief of internal pressures. In one arrangement, a frangible diaphragm was provided that was either blown out upon the currents of a predetermined pressure, or broken by a mechanical device pressure sensitive when an excess pressure existed within the enclosure. Frangible diaphragms of this type were generally mechanically weak, and susceptible to damage resulting from handling or exposure to moisture or corrosive atmospheres. Further, repeated flexing resulting from changes in internal pressure on occasion resulted in fatigue of the diaphragm material, and the consequent premature rupture thereof. As a further disadvantage of this type of pressure relief device, it was generally difficult to replace the frangible diaphragm, and it was also necessary to stock replacement diaphragms in the event that the diaphragm was broken.

In another type of currently employed relief device, a metallic disk cover is employed over an aperture in the enclosure, and a latch or other mechanical locking device is provided within the enclosure to hold the cover in place. Such devices generally employ a pressure sensitive bellows in order to trigger the locking or latching mechanism to release the cover when the pressure within the enclosure exceeds a predetermined value. While such devices eliminate the necessity for a frangible diaphragm, they are generally much more expensive, and the use of a pressure-sensitive bellows complicates the over-all mechanism as well as introducing an easily damaged member into the device.

It is, therefore, an object of this invention to provide an improved pressure relief device.

It is also an object to provide a pressure relief device requiring a minimum number of components, and in which the operation is dependent to a minimum upon frictional contact between the various components thereof.

A further object of this invention is to provide a mechanical pressure relief device that does not employ frangible members for releasing pressure, and which may be readily reset without requiring disassembly of the device.

It is a still further object to provide a pressure relief device whose operation is not dependent upon the use of sensitive easily damaged pressure-sensing devices such as metallic bellows.

A still further object of this invention is to provide a pressure relief device characterized by the fact that it employs an economical means for holding a cover over an aperture in an enclosure, and in which a rugged, accurate release arrangement employing a minimum of components is employed to accurately effect the release of the device at a predetermined pressure.

Briefly stated, in accordance with my invention, I provide a pressure relief device for an enclosure having an aperture. A releasable cover means is provided externally covering the aperture. A pivot block means is provided, and means such as a shaft is employed to transmit pressure that may occur on the inner side of the cover means to the pivot block means. Means are further provided to releasably restrain movement of the pivot block means due to the pressure on the cover means, and hence to releasably hold the cover in place over the aperture, comprising roller means contacting the pivot block means. The point of contact between the block means and the roller means is arranged so that the pressure on the block means is transmitted to the roller means in a direction such that the force on the roller means does not pass through the axis of the roller means. In other words, the pressure on the roller means tends to provide a moment on the roller means. Means such as a spring are provided to provide a resilient force on the roller means normal to the pressure exerted thereon due to the pressure on the pivot block means, the resilient force serving to hold the roller means against the pivot block means. Means are further provided to substantially inhibit movement of the roller means in the direction of the pressure on the roller means resulting from contact with the block means. Also, an O-ring is provided in an enlarged groove to eliminate resistance to movement of the cover means yet still provide a fluid-tight seal.

While the specification concludes with claims particularly pointing out and distinctly claiming the subject matter which I regard as my invention, it is believed that the invention will be better understood from the following description taken in connection with the accompanying drawings.

In the drawings:

FIG. 1 is a perspective partially cross-sectional view of a pressure relief device according to one embodiment of my invention, FIG. 2 is a partially cross-sectional view of the pressure relief device of FIG. 1 and illustrating the cover means in the closed position, FIG. 3 is a partially cross-sectional view of the pressure relief device of FIG. 1 and illustrating the cover means in the open position, FIG. 4 is a force diagram of the pressure relief device of my invention, and FIG. 5 is a partially cross-sectional view of a portion of a pressure relief device according to my invention and illustrating a modified arrangement permitting simple variation in the predetermined opening pressure of the device.

Referring now to the drawings, and more in particular to FIGS. 1 and 2, therein is illustrated a pressure relief device for releasably covering an aperture 10 in the wall 11 of an enclosure. A flanged member 12 is provided surrounding the aperture 10, the flanged member 12 having an annular portion 13 extending away from the aperture, and a flat annular portion 14 in a plane parallel to the plane of the enclosure 11 adapted to be bolted or otherwise rigidly affixed to the enclosure. To permit more rigid construction, the wall 11 may be provided with an increased thickness portion 15 surrounding the aperture 10, the increased thickness portion 15 being welded or otherwise rigidly affixed to the enclosure. The external side of the extending portion 13 of flange member 12 is preferably provided with an annular groove 16, and an O-ring gasket 17 is provided in groove 16. The width of the groove 16 is preferably substantially greater than the thickness of the gasket member 17 for reasons that will be explained in more detail in the following paragraphs.

A disk-shaped cover 20 is provided over the external end of the flange member 12. The cover member 20 has flanged edges 21 extending around the annular portion 13 of the flanged member 12, so that the inner sides of the portion 21 of cover 20 engages the O-ring gasket 17. The ends 22 of the flanges 21 of cover 20 may have a slight curvature to permit ready placement of the cover over the flange member 12.

A shaft 25 is provided rigidly affixed to the center of the cover 20, the shaft 25 extending through the aperture generally normal to the plane of the enclosure 11. The joint between the shaft 25 and cover 20 is sealed to prevent leaks, and as an example of an arrangement for connecting the shaft 25 to the cover 20, an end 26 of the shaft 25 may be threaded in a nut 27 welded to the inside of the cover 20, the end 26 extending through the cover 20 and being provided with a nut 28 on the outside of the cover 20 and holding a gasket 29 between the outside of the cover and the shaft. The shaft 25 extends through a guide member 30 which is rigidly held within the enclosure, for example, by means of brackets 31 affixed to the flange member 12. The guide member 30 serves to permit the shaft 25 to move only in an axial direction.

A pair of channel-shaped members 35 are pivoted in the guide member 30 on opposite sides thereof, and extend toward the cover 20. A roller 36 is mounted in the upper end of each channel-shaped member 35 the axes of the rollers 36 being parallel and extending in a plane normal to the axis of the shaft 25. The rollers 36 are held resiliently against opposite sides of the shaft 25, and to serve this purpose, a pair of helical springs 37 may be provided between rods 38 on opposite sides of the channel-shaped members 35. The rods 38 are held to the upper ends of the channel-shaped members 35, for example in projections 39. With this arrangement, the springs 37, which are in tension, tend to pull the rods 38 together, and hence resiliently force the rollers 36 held by the channel-shaped members 35 with substantially equal pressure against opposite sides of the shaft 25. The channel-shaped members 35 which are pivoted in the guide member 30, hold the rollers 36 against any substantial movement in an axial direction with respect to the shaft 25, but permit the rollers to be forced away from the shaft 25.

A block 40, preferably of hardened metal, is rigidly affixed to the shaft 25, such as by means of pins 41 extending through the block and shaft 25. The block 40 is positioned between the holding member 30 and the rollers 36, and the lower end of the block 40 may rest against the upper end of the guide member 30 when the relief device is closed as in FIGS. 1 and 2. The upper end of block 40 contacts the rollers 36, the lines of contact between the rollers 36 and block member 40 preferably being parallel to the axes of the rollers 36. The radii of the rollers 36 are greater than the distance between the shaft 25 and the line of contact between the rollers 36 and block 40. The block 40 should not be sufficiently long, however, to prevent contact between the rollers and shaft when the cover is closed.

The guide member 30 may have an upper portion 45 in which the channel-shaped members 35 are pivoted, and a lower cylindrical portion 46 extending away from the cover 20, with a shoulder 47 between the portions 45 and 46. A slot 48 may be provided in the lower end of the cylindrical portion 46 of guide member 30, so that a pin 49 in the end of the shaft 25 may extend through the slot 48 to hold a spring holder 50, the spring holder slidably surrounding the cylindrical portion 46 of the guide member 30. A helical spring 51 extends between the spring holder 50 and the offset 47, the spring 51 being in compression so that it tends to force the shaft 25 downwardly and hence to force the cover 20 in closed position over the flange member 12.

Referring now to FIG. 3, which shows the pressure relief device in FIGS. 1 and 2 in open position, the cover 20 has been moved upwardly beyond the flange member 12 so that fluid may escape from the enclosure through the aperture 10, in the direction shown by the arrows in this figure. In this position, the block 40 has moved upwardly between the rollers 36, so that the rollers 36 are held, by means of springs 37, against the relatively straight side of the block 40. The pin 49 is held against the upper end of the slot 48 to limit the upward travel of the cover 20. The pin 49 on the end of shaft 25 has also moved upwardly effecting the compression of spring 51, so that the spring 51 provides a force tending to close the cover 20 in opposition to the force of the fluid escaping from the enclosure.

The operation of my relief device may be best disclosed by first referring to the force diagram of FIG. 4. In this figure are shown the end view of two cylindrical member B and M resting against each other, the axes of the members B and M being parallel. The axis of the cylindrical member B carries a load figuratively represented by the block W, and the member B is prevented from rolling down the left-hand circumference of the cylindrical member M by a horizontal force P also acting on the axis of the cylindrical member B. Assume that a barrier XX is provided to the right of the small cylinder B to limit the clockwise rotation of the cylinder B about the cylinder M, the horizontal distance S between the barrier XX and the junction D between the two cylinders being less than the radius of the cylinder B. Assume also that an angle alpha exists between a vertical line through the axis of the cylinder B and the line OA joining the axes of cylinders B and M. Under these conditions, if P cotangent $\alpha$ exceeds W, the force tending to roll the cylinder B clockwise around the cylinder M will be greater than the force tending to roll the cylinder B counterclockwise around the cylinder M, so that the cylinder B will remain in a static position against the barrier XX. If, however, the value of W exceeds the critical value of P cotangent $\alpha$, the cylinder B will roll slightly counterclockwise around the cylinder M. Since this results in a slight increase in the angle $\alpha$, the value of P cotangent $\alpha$ will be reduced and consequently the clockwise force will also be reduced. With reductions in the counterclockwise force P cotangent $\alpha$ the angle $\alpha$ rapidly increases due to the influence of the load W, and consequently the cylinder B will roll more and more rapidly counterclockwise about the cylinder M. From a practical standpoint, since the system collapses as soon as the cylinder B commences to roll counterclockwise about the cylinder M, the portions of the cylinder M on both sides of the initial point of contact D are never used, and hence, may be replaced by a rectangular figure or a rectangular member DEFG extending downwardly and to the right of the point of contact D. Thus, a similar force relationship would result by the replacement of this cylinder M with the rectangular figure DEFG at a considerable saving in space and material.

Referring again to FIGS. 1 and 2, in comparison with the force diagram of FIG. 4, the cylinders or rollers 36 correspond to the cylindrical member B of FIG. 4, and the block member 40 corresponds to the rectangular figure DEFG of FIG. 4. The shaft 25 of FIGS. 1 and 2 corresponds to the barrier XX of FIG. 4, and the tension springs 37 provide the force P to hold the cylindrical members against the barrier. In operation, internal pressures within the enclosure are exerted against the cover 20, and this force is transmitted by means of the shaft 25 to the block 40. This force is in turn exerted by the block 40 upwardly on the rollers 36, and is balanced by a downward force since the rollers 36 are held by the channel-shaped members 35. This downward force on the rollers 36 corresponds to the load W in FIG. 4, and is hence equal to the upward pressure on the cover 20. When the force on the cover 20 exceeds a predetermined amount, as determined by the tension in the springs 37, the radius of the rollers 36, and the distance from the shaft 25 to the line of contact between the rollers 36 and block 40 (corresponding to the dimension S of FIG. 4), the upward pressure on the block 40 will cause the rollers 36 to roll slightly about their lines of contact with the block 40. This slight rotation results in the rapid reduction of the force resisting rotation of the rollers due to the increase in the angle $\alpha$ (FIG. 4) and hence the block 40 may move rapidly upward, permitting the rapid opening of the cover 20 to permit escape of the fluid pressure from within the enclosure. As illustrated in FIG. 2, when the cover 20 opens, the rollers 36 roll along the substantially vertical sides of the block 40, so that the springs 37 exert no force on the block tending to close the cover.

While the spring 51 is compressed when the cover 20 is in open position, the force exerted by the spring 51 tending to close the cover 20 is small as compared with the enclosure pressure, so that the spring 51 will not effect the closing of the cover 20 until substantially all pressure has been relieved from the enclosure. When the pressure has thus been relieved, the spring 51 acting on the shaft 25 will effect the closure of the cover 20. In order that the compression of the spring 51 is not a factor in the pressure required to open the pressure relief device, as a practical matter it has been found that the spring 51 will not have sufficient force to completely close the cover 20 upon dissipation of the pressure within the enclosure. Therefore, it may be necessary to exert a small downward force on the cover 20 in order to reset the device. No disassembly or complicated procedure is thus required for resetting the pressure relief device of my invention once it has operated.

As stated previously, the critical factors determining the pressure of operation of the device are the tension of the springs 37, the radius of the roller 36, and the dimension between the shaft 25 and line of contact between the rollers 36 and block 40. The rollers 36 may be accurately and economically ground to close tolerances, and similarly the dimension between the shaft 25 and line of contact between the rollers 36 and block 40 may be also accurately ground to close dimension. The maintaining of close tolerances on the latter dimension may be simplified if the block 40 and shaft 37 are formed from a single piece. Furthermore, the springs 37 may also be selected to have tensile force within close tolerances, so that accuracy of the pressure relief device of my invention, as heretofore disclosed, may be readily and economically obtained without the use of sensitive frangible pressure detecting devices.

In order to change the pressure of operation of the relief device of my invention, either the tension of the spring 37, the diameter of the rollers, or the dimension between the shaft 25 and line of contact between the rollers and block 40 may be changed. For example, the springs 37 may be replaced by new springs having different tensions, or the rollers 36 may be replaced by rollers having different radii. As a preferred method of changing the pressure of operation of the device, however (referring to FIG. 5), the dimension between the shaft 25 and point of contact between the rollers 36 and block 40 may be readily varied by the insertion of a collar 55 over the shaft 25 between the rollers. The collars 55 may be ground to accurate dimension, and if desired a number of such collars having different wall thicknesses may be provided in order to permit the rapid adjustment of the device to operate at any of a number of predetermined pressures.

Since there is a possibility that, with the use of conventional gaskets between the cover 20 and the flange member 12, that the gasket will grip the cover 20 and cause inaccurate opening of the pressure relief device, it is preferred that the gasket be in the form of an O-ring 17 disposed in a wide annular groove 16 on the side of the flange member 12. With this arrangement, the O-ring 17 will roll in the groove 16 and hence not provide any substantial resistance to the upward movement of the cover 20.

While a single roller 36 may be employed to hold the block 40 from axial movement until a predetermined pressure occurs within the enclosure, it is preferred that a pair of rollers 36 be held against opposite sides of the shaft 25 in order that the transverse forces on the shaft 25 be balanced and hence the friction of the system be reduced. It will be obvious, of course, that additional rollers may also be employed. Similarly, while it is preferred that the channel-shaped members 35 pivoted in the guide member 30 be employed to hold the rollers 36 against any substantial axial movement with respect to the shaft 25, and that helical tension spring 37 extending between the channel-shaped members 35 be employed to hold the rollers against the shaft 25, it is obvious that other arrangements may be equally well applied without departing from the spirit and scope of my invention. By referring to upward and lower movements of the various members, as well as to upper and lower positionings of the components and vertical and horizontal directions, I have intended only to facilitate the disclosure of my invention, and it will be obvious that these terms are purely relative since the pressure relief device of my invention may be mounted in any direction.

It will be understood, of course, that, while the form of my invention herein shown and described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. A pressure relief device for an enclosure having an aperture comprising flange means having a cylindrical portion extending externally from said enclosure about said aperture, there being an annular external groove in said flange means, O-ring gasket means in said groove, said groove having a width substantially greater than the thickness of said gasket means, disk-shaped cover means externally covering said flange means and having a cylindrical flange telescopically engaging over the cylindrical portion of said flange means and engaging said gasket means, shaft means attached to said cover means and extending through said aperture into said enclosure, guide means attached to said enclosure and arranged to guide said shaft means only for axial movement, block means rigidly mounted on said shaft means, a pair of movably mounted roller means having parallel axes in a plane normal to the axis of said shaft means, said roller means being disposed on opposite sides of said shaft means adjacent said block means, tension spring means extending between said roller means and holding said roller means against opposite sides of said shaft means between said cover means and said block means when said cover means is in its fully closed position.

2. A pressure relief device for an enclosure having an aperture comprising flange means having a portion extending externally from said enclosure about said aperture, there being an annular external groove in said flange means, O-ring gasket means in said groove, said groove having a width substantially greater than the thickness of said O-ring, cover means externally covering said flange means and having a flange telescopically engaging over said portion of said flange means and engaging said O-ring to provide a seal about said opening, shaft means attached to said cover means and extending through said aperture into said enclosure, and means on said shaft providing a force restraining said shaft from movement until a predetermined pressure on the inside of said cover has been exceeded, said last-mentioned means being arranged to rapidly decrease said restraining force immediately upon movement of said shaft responsive to a pressure in excess of said predetermined pressure, the cover flange being movable with said shaft and causing said O-ring to roll in said groove to maintain said seal until after said restraining force has been decreased whereby upon the rolling of said O-ring in said groove resistance to movement of the cover is substantially eliminated.

3. In a transformer of the enclosed type, there being an aperture in the enclosure, a pressure relief device comprising flange means having a portion extending externally from said enclosure about said aperture, there being an annular external groove in said flange means, O-ring gasket means in said groove, said groove having a width substantially greater than the thickness of said O-ring, cover means externally covering said flange means and having a flange telescopically engaging over said portion of said flange means and engaging said O-ring to provide a seal about said opening, shaft means attached to said cover means and extending through said aperture into said transformer, and means on said shaft providing a force restraining said shaft from movement until a predetermined pressure on the inside of said transformer has been exceeded, said last-mentioned means being arranged to rapidly decrease said restraining force immediately upon movement of said shaft responsive to a pressure in excess of said predetermined pressure, the cover flange being movable with said shaft and causing said O-ring to roll in said groove to maintain said seal until after said restraining force has been decreased, whereby upon the rolling of said O-ring in said groove resistance to movement of the cover is substantially eliminated.

4. An enclosure subject to random internal pressure rises of excessive magnitude capable of structurally damaging said enclosure, said enclosure having an aperture in a wall thereof, and a pressure relief device calibrated to close said aperture until a predetermined pressure within said enclosure has been exceeded, said pressure relief device comprising a flanged member surrounding said aperture and attached to said wall, an annular portion of said flanged member extending beyond said wall, the interior surface of said annular portion defining an axial bore registering with said aperture, a cover movable axially of said bore between a closed position and an open position in response to internal pressure changes in said enclosure, said cover normally closing said aperture and having an annular rim with an interior surface telescopically mating with the exterior surface of said annular portion, there being a continuous groove around one of said mating surfaces, a resilient O-ring gasket within said groove to provide a seal about said opening, the mating surfaces on said rim and annular portion being substantially parallel and compressing said gasket radially of said bore when said cover is in its closed position, a shaft attached to and movable with said cover, said shaft extending into said bore and said aperture, a member guiding said shaft through said opening, and means on said shaft providing a force restraining said cover from venting said opening until said predetermined pressure has been exceeded said last-mentioned means being arranged to rapidly decrease said restraining force immediately upon movement of said shaft responsive to a pressure in excess of predetermined pressure, and means maintaining said seal until after said restraining force has been decreased.

References Cited in the file of this patent
UNITED STATES PATENTS

| | | |
|---|---|---|
| 419,940 | Guels | Jan. 21, 1890 |
| 1,560,457 | Wood | Nov. 3, 1925 |
| 1,895,789 | Doering | Jan. 31, 1933 |
| 2,165,611 | Campbell | July 11, 1939 |
| 2,394,364 | Christensen | Feb. 5, 1946 |
| 2,431,769 | Parker | Dec. 2, 1947 |
| 2,525,487 | Johnson | Oct. 10, 1950 |
| 2,573,761 | Firth | Nov. 6, 1951 |
| 2,904,616 | Koepke et al. | Sept. 15, 1959 |